US006433933B1

(12) United States Patent
Gettemy

(10) Patent No.: US 6,433,933 B1
(45) Date of Patent: Aug. 13, 2002

(54) INTERNAL DIFFUSER FOR A CHARGE CONTROLLED MIRROR SCREEN DISPLAY

(75) Inventor: Shawn Gettemy, San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/820,522

(22) Filed: Mar. 29, 2001

(51) Int. Cl.[7] .............................................. G02B 13/20
(52) U.S. Cl. ...................... 359/599; 359/290; 359/831; 349/64
(58) Field of Search ................................. 359/242–249, 359/290–298, 318, 599, 707, 831–836; 349/61–72; 362/31

(56) References Cited

U.S. PATENT DOCUMENTS

| | | | | |
|---|---|---|---|---|
| 4,310,219 A | * | 1/1982 | Jaccard ........................ | 359/599 |
| 4,571,603 A | * | 2/1986 | Hornbeck et al. ........... | 346/160 |
| 5,608,550 A | * | 3/1997 | Epstein ........................ | 349/64 |
| 5,844,713 A | * | 12/1998 | Nanba et al. ................ | 359/364 |
| 5,999,319 A | | 12/1999 | Castracane .................. | 359/573 |
| 6,031,657 A | | 3/2000 | Robinson et al. ............ | 359/293 |
| 6,034,810 A | | 3/2000 | Robinson et al. ............ | 359/293 |
| 6,115,152 A | | 9/2000 | Popovich et al. ............. | 359/15 |
| 6,123,985 A | | 9/2000 | Robinson et al. ............ | 427/162 |
| 6,323,834 B1 | * | 11/2001 | Colgan et al. ................ | 345/84 |
| 6,327,398 B1 | * | 12/2001 | Solgaard et al. ............. | 385/18 |
| 6,335,817 B1 | * | 1/2002 | Phillipps ...................... | 359/290 |

* cited by examiner

*Primary Examiner*—Thong Nguyen
(74) *Attorney, Agent, or Firm*—Foley & Lardner

(57) ABSTRACT

A mobile electronic device is disclosed. The mobile electronic device includes a processor and a communications bus coupled to the processor. The mobile electronic device also includes a light source. Further, the mobile electronic device includes a charge controlled mirror display. The charge controlled mirror display is coupled to the communications bus. The charge controlled mirror display includes an array of charge controlled mirrors. At least some of the charge controlled mirrors have a textured surface configured to cause reflective diffusion of light from the light source. The charge controlled mirrors have reflectance that is selectively controlled according to signals communicated along the communications bus.

23 Claims, 5 Drawing Sheets

INTERNAL DIFFUSER FOR A CHARGE CONTROLLED MIRROR SCREEN DISPLAY

FIELD OF THE INVENTION

The present specification relates to display devices for mobile electronic devices. In particular the present specification relates to display devices utilizing micro-machine mirrors or charge controlled mirror devices.

BACKGROUND OF THE INVENTION

Handheld computing devices, "palmtops", or "palmhelds", PDAs or handheld computers typically weigh less than a pound and fit in a pocket. These handhelds generally provide some combination of personal-information management, database functions, word processing and spreadsheets. Because of the small size and portability of handhelds, strict adherence to hardware constraints, such as display hardware constraints, must be maintained.

It is conventional to employ a Liquid Crystal display (LCD) or thin film transistor (TFT) display in computing devices such as handhelds. However, such displays may be undesirably bulky or may have undesirable power requirements. Further, TFT display LCD displays and the like may be undesirably costly.

Recent development has focused on creating displays using microelectro mechanical systems (MEMS) to provide reflective displays using micro-machine mirrors or charge controlled mirrors (CCMS) configured in an array to provide both monochrome and color displays for handheld computers and other types of displays. Such micro-machine mirror arrays may be used to provide high density, high resolution color displays. Many micro-machine mirrors are used in the array to represent a single pixel.

However, because the micro-machine mirrors are purely reflective displays, diffusion of the light reflected by the micro-machine mirrors is required in order to provide a useable and desirable field of view to the user. Accordingly, it is desirable to scatter or diffuse the light reflected by the mirrors before it reaches the user. Conventionally, to provide a micro-machine mirror display, a film diffuser would be applied at or near the surface of the display. Such overlaying film diffusers often have the disadvantage of causing the image reflected from the display to become blurred. Further, such thin film diffusers may not be aesthetically appealing and may become scratched or damaged.

Accordingly, there is a need for an apparatus that utilizes micro-machine mirror technologies to provide a low cost, low power display solution. Further, there is a need for the method and apparatus using micro-machine mirrors which provides a highly reflective, clear, crisp image from the display utilizing diffusion such that the display does not provide a mirror-like image. Further still, there is a need for an apparatus that utilizes micro-machine mirrors in a display, the micro-machine mirrors including surface structures causing diffusion of light reflected by the mirrors. Yet further still, there is a need for an apparatus utilizing micro-machine mirrors that provides an improved field of view over conventional micro-machine mirror displays.

The techniques herein below extend to those embodiments which fall within the scope of the appended claims, regardless of whether they accomplish one or more of the above-mentioned needs.

SUMMARY OF THE INVENTION

An exemplary embodiment relates to a video display. The video display includes a light source providing light for the video display. The video display also includes an array of charge controlled mirrors, each charge controlled mirror of the array being controlled by applying a charge, to selectively reflect light from the light source, dependent upon the applied charge, at least some of the charge controlled mirrors having a textured surface configured to cause reflective diffusion.

Another exemplary embodiment relates to a mobile electronic device. The mobile electronic device includes a processor, a communications bus coupled to the processor, and a light source. The mobile electronic device also includes a charge controlled mirror display. The charge controlled mirror display is coupled to the communications bus. The charge controlled mirror display includes an array of charge controlled mirrors, at least some of the charge controlled mirrors having a textured surface configured to cause reflective diffusion of light from the light source. The charge controlled mirrors have reflectance that is selectively controlled according to signals communicated along the communications bus.

Another exemplary embodiment relates to a charge controlled mirror for use in an electronic display device. The charge controlled mirror includes a selectively reflective surface. The charge controlled mirror also includes an electronic coupling to a selective power source. The selectively reflective surface is a substantially textured surface configured to cause diffusion of reflected light and is configured to change reflective properties based on charge provided by the electronic coupling.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
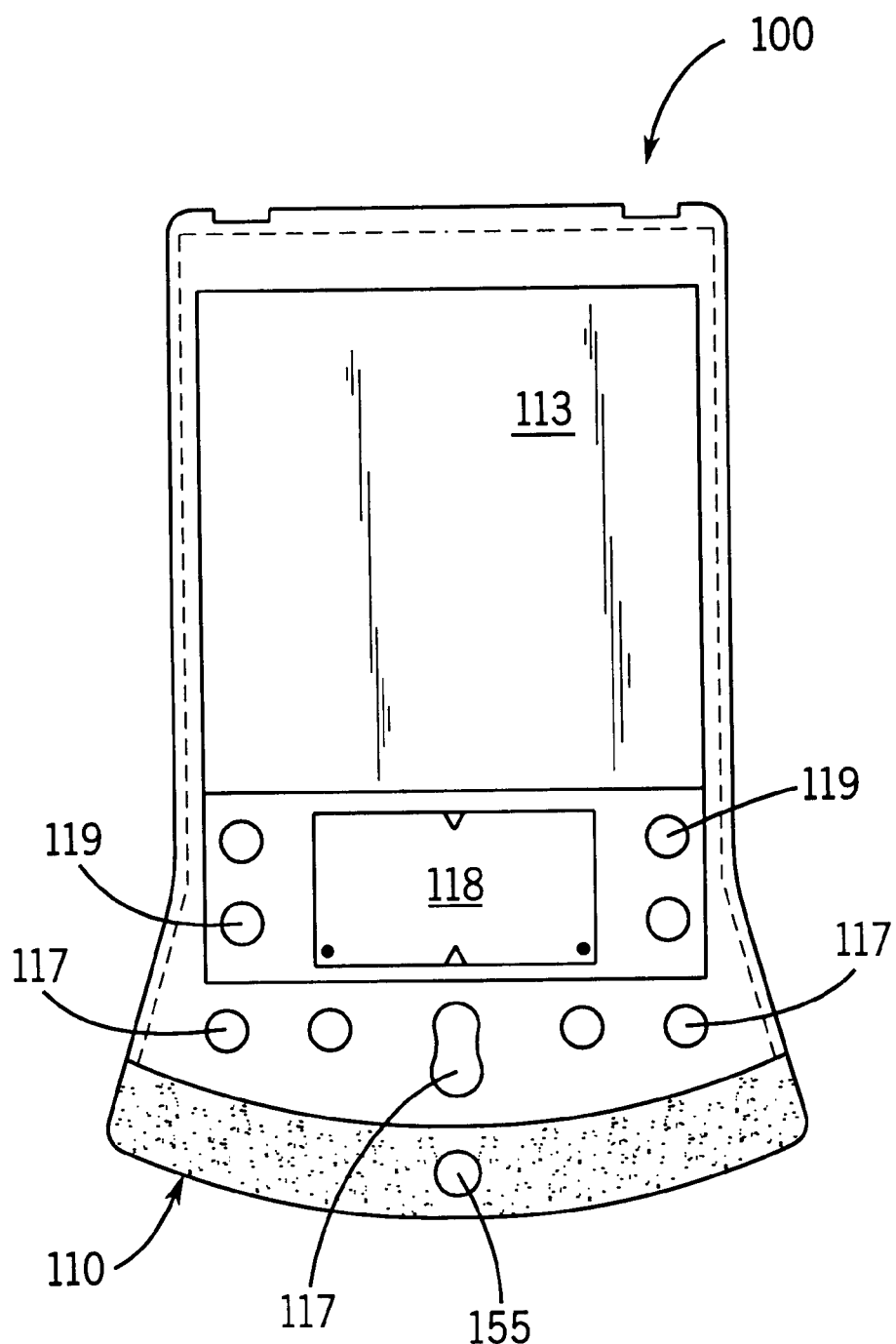
FIG. 1 is depiction of a handheld computer.

Referring to FIG. 1, a handheld computer 100 is depicted, being optionally detachably coupled to an accessory device 110 according to an exemplary embodiment. Handheld computer 100 may include handheld computers such as those manufactured by Palm, Inc., of Santa Clara, Calif. Other exemplary embodiments of the invention may include Windows CE™ handheld computers, or other handheld computers and personal digital assistants, as well as cellular telephones, and other mobile computing devices or any other electronic devices requiring video display technology. Further, hand-held computer 100 may be configured with or without accessory device 110 or optionally with any of a variety of other accessory devices.

Preferably, handheld computer 100 includes interactive hardware and software that performs functions such as maintaining calendars, phone lists, task lists, notepads, calculation applications, spreadsheets, games, and other applications capable of running on a computing device. Handheld computer 100, shown in FIG. 1 includes a plurality of input functions, keys 117 and a display 113 having graphical user interface features. Display 113 may be provided with an interface that allows a user to select and alter displayed content using a pointer, such as, but not limited to, a stylus. In an exemplary embodiment, display 113 also includes a Graffiti™ writing section 118, or other handwriting recognition software, for tracing alphanumeric characters as input. A plurality of input buttons 119 for performing automated or preprogrammed functions may be provided on a portion of display 113. In a particular embodiment, display 113 is a touch screen display that is electronically responsive to movements of a stylus or other device, including a user's finger, on the surface of display 113.

Accessory device 110 may be one of several types of accessories, such as, but not limited to, a modem device for serial and/or wireless data communications, a Universal Serial Bus (USB) device, or a communication cradle having an extended housing. Accessory device 110 may include one or more ports for parallel and/or serial data transfer with other computers or data networks. Handheld computer 100 may use the accessory device 110 for the purpose of downloading and uploading software and for synchronizing data on hand-held computer 100 with a personal computer, for example. Accessory device 110 may couple to handheld computer 100 through an electrical connector located at a bottom portion of its front face or may utilize any other type of connection. Button 155 on accessory 110 may effectuate an electrical connection between accessory device 110 and handheld computer 100 when the two are connected.

Figure 2:
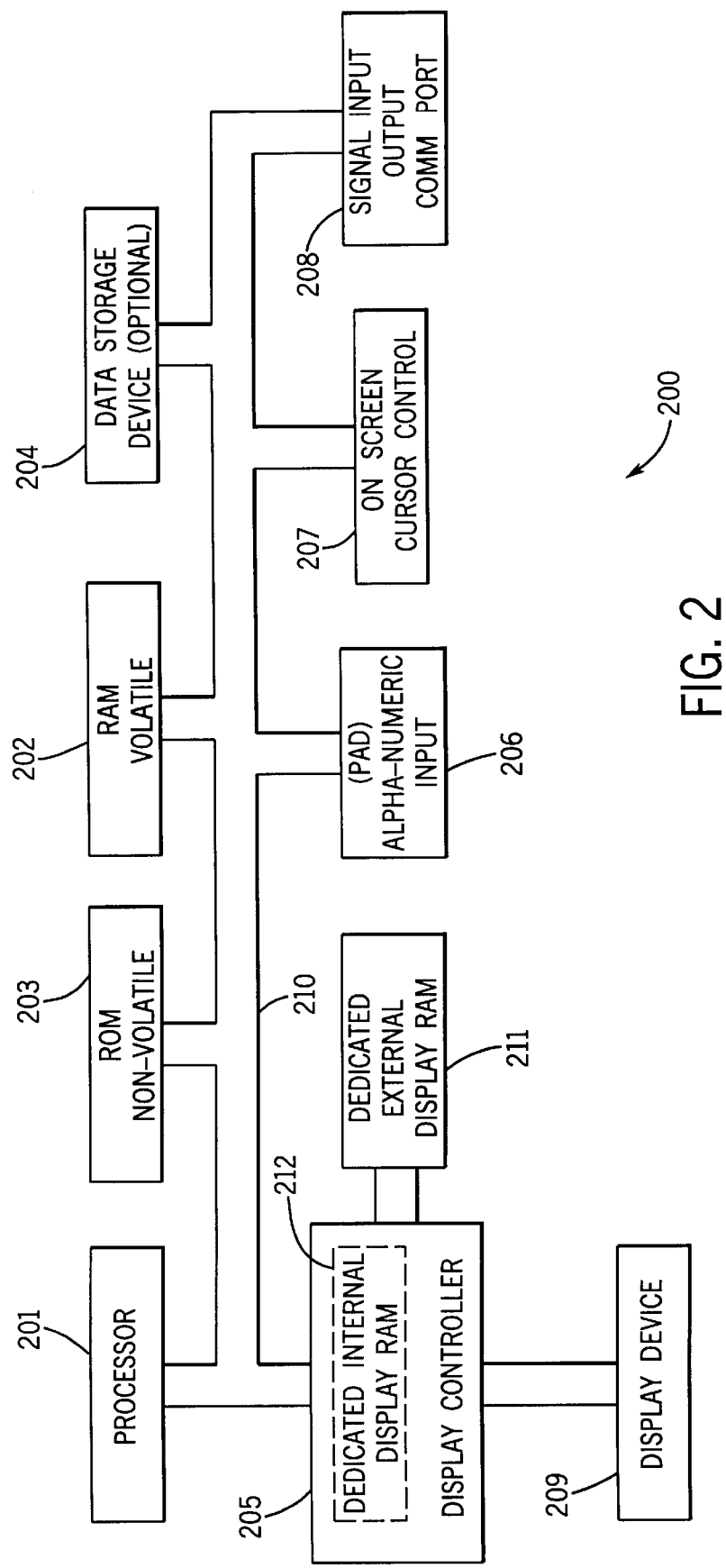
FIG. 2 is a depiction of a communications bus architecture for a handheld computer.

Referring now to FIG. 2, an exemplary communication bus architecture 200 is depicted. Bus architecture 200 includes a processor 201, a random access volatile memory 202, a read-only non-volatile memory (ROM) 203, a data storage device 204 which may be an optional device, such as a disk drive, hard disk drive, optical disk drive, flash memory, or the like. Processor 201, RAM 202, ROM 203, and data storage device 204, are coupled to and in communication with a communications bus 210. Further, coupled to and in communication with communications bus 210 are a display controller 205, an alphanumeric input 206, an on-screen cursor control 207, a signal input/output communications port 208, and a dedicated external display RAM 211. Yet further still, display device 209 is coupled to display controller 205 (display controller 205 may be, but is not limited to, a Seiko Epson 1375 display controller). Display controller 205 further includes a dedicated internal display RAM 212.

In operation, processor 201 runs program applications stored in ROM 203, RAM 202, and/or data storage device 204. Many of these applications require screen displays. For example, some applications, such as, but not limited to, memo pads, date books, contacts or telephone books, etc., require graphical information to be displayed on display 113. Also, other types of graphical information may require greater color depth, and/or greater resolution, such as, but not limited to, map displays, Chinese characters, games, etc.

Further, other applications may require a very high resolution and very high color depth, including such applications that require the display of photographic images and the like.

In the exemplary embodiment of FIG. 2, display controller 205 (or processor 201) is configured to run a display logic (or other software for controlling display 13) which utilizes dedicated external display RAM 211 and dedicated internal display RAM 212 to provide display information to display device 209. During use, processor 201 which is coupled to bus 210 may dictate information being received by display controller 205. Display controller 205 uses dedicated external display RAM 211 and dedicated internal display RAM 212 to provide signals to display device 209. Such signals provided to display device 209 cause the selective changing of state of pixels on display device 209 from on to off conditions or possibly conditions in between. In an exemplary embodiment, display device 209 may be a charge controlled mirror or micro-machine mirror display device as depicted in FIGS. 3 and 4.

Figure 3:
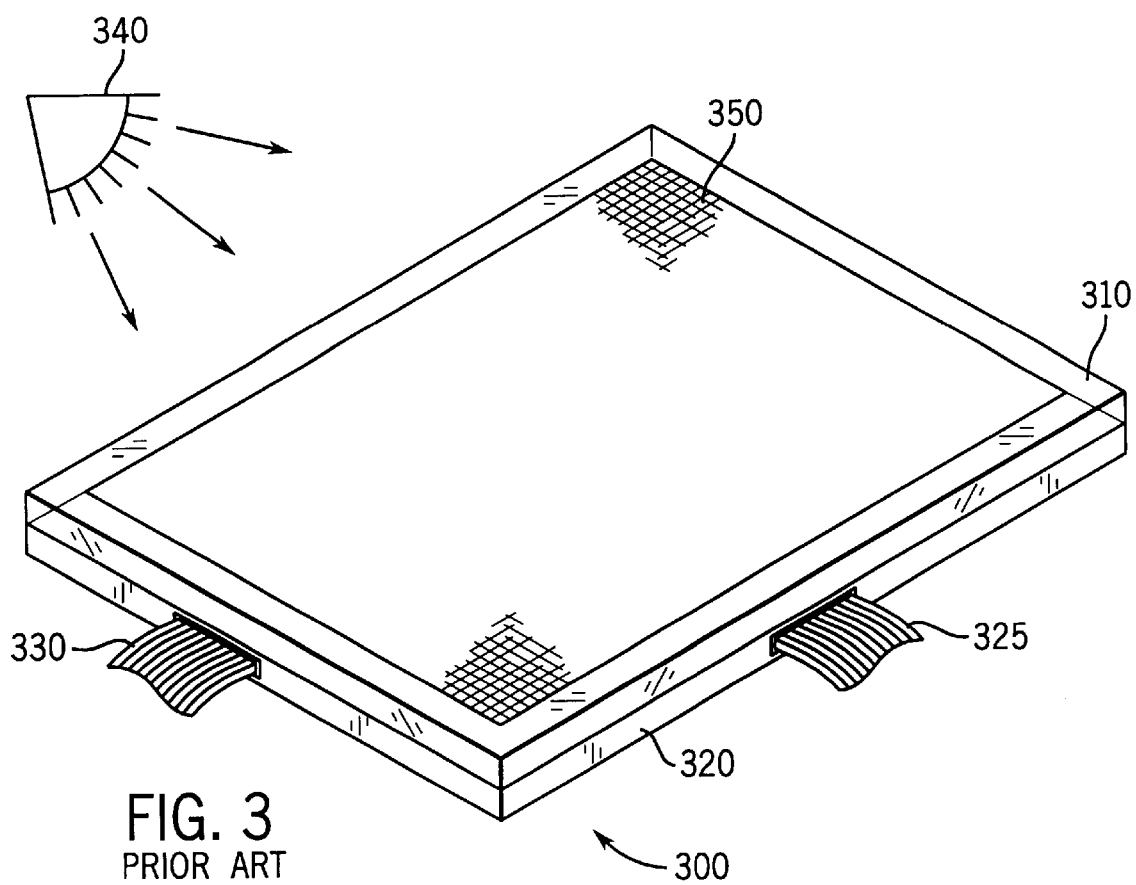
FIG. 3 is a depiction of a charge controlled mirror assembly display having a film diffuser of the prior art.
Figure 4:
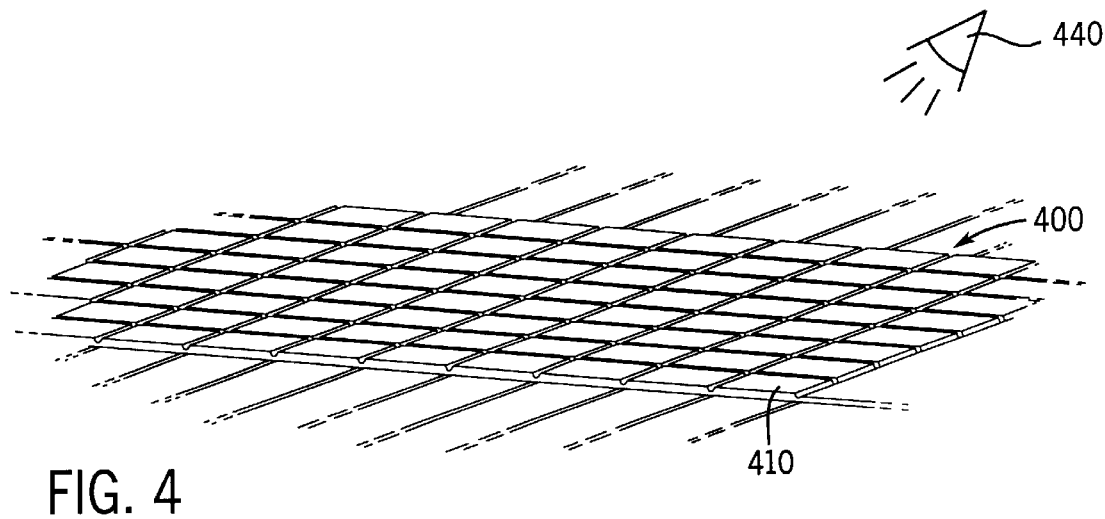
FIG. 4 is a depiction of a charge controlled mirror array.

Referring now to FIG. 3, a display 300 is depicted. Display 300 may be used in display device 209 of FIG. 2. Display device 300 includes a display glass 310 or any other type of substantially transparent material overlaying a micro-machine mirror array assembly 320. Assembly 320 includes electrical connectors 325 and 330. Electrical connectors 325 and 330 may be configured in any of a variety of ways including, but not limited to, horizontal electrical connectors 325 and vertical electrical connectors 330. Electrical connectors 325 are coupled to display controller 205 and receive signals therefrom. Electrical connectors 325 and 330 selectively provide charge to control the mirrors of the charge controlled mirror array in assembly 320 according to signals received from display controller 205. Light coming from a light source 340 which may be an internal light source or may be an external light source such as a lamp or any environmental lighting, is selectively reflected from mirrors of the charge control mirror array in assembly 320. For example, referring to FIG. 4, a micro-machine mirror array 400 is depicted receiving light from a light source 440 similar to light source 340. Micro-machine mirror array 400 includes a plurality of micro-machine mirrors 410 in which the reflectance of mirrors 410 in the array 400 are selectively turned on and off according to charge applied to the selected mirror of the array. In an exemplary embodiment, the plurality of such mirrors (maybe 10, 100, 1000, or more) is utilized to represent a single pixel in a conventional video display. When charge is applied to a mirror 410, the material forming mirror 410 is deformed thereby causing a change in the reflectance properties of the material. Accordingly, when charge is applied, the reflectance may change from fully reflective to partially reflective or non-reflective, as it appears to an observer.

Figure 5:
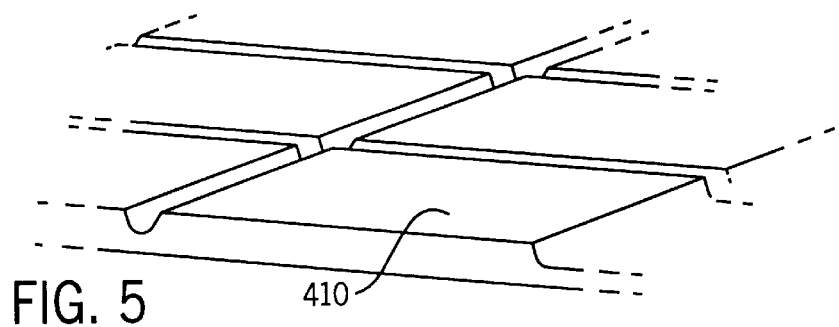
FIG. 5 is a depiction of a close up view of a charge controlled mirror.

Referring to FIG. 5, a close up view of a single charge controlled mirror 410 is depicted. Charge controlled mirror 410 is a conventional charge controlled mirror which has a highly reflective surface when no charge is applied. It is, however, desirable to have a surface which causes diffusion of the reflected light. Accordingly, conventional solutions of the prior art include an overlying film diffuser 350 depicted in FIG. 3. Such a diffuser may be a plastic film diffuser such as a polycarbonate film diffuser that is configured to diffuse light transmitted therethrough. Diffuser 350 may include a surface which has a plurality of surface structures such as grooves and/or pyramids or the like. Diffuser 350 may overlie glass 310 or further may be configured under glass 310. In any state, diffuser 350 may not be an ideal solution in that diffuser 350 may cause the image to be blurred.

However, because of the highly reflective nature of mirrors 410, it is necessary that some reflective diffusion occur in order to widen the field of view, provide brilliance and clarity, and further to provide a display without a significant amount of glare.

Figure 6:
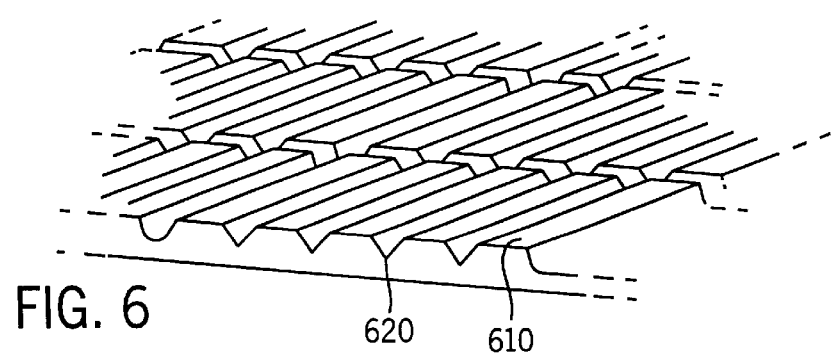
FIG. 6 is a depiction of a close up view of a charge controlled mirror having a textured surface.

Therefore, a micro-machine mirror or charge controlled mirror array may be provided with micro-machine mirrors 610 having a plurality of surface structures 620 on each mirror 610 or on selected mirrors 610. Structures 620 may include any of a variety of surface textures and/or structures, such as, but not limited to, grooves (shown in FIG. 6), pyramids, truncated pyramids, triangular grooves, semicircular grooves, arcuate grooves, convex structures and the like. It should be noted that structures 620 may be provided on the surface of mirrors 610 in random patterns, such as but not limited to a random pattern of bumps, depressions, or grooves, as well as the regular patterns depicted. Structures 620 cause diffusion of light striking mirrors 610 rather than using a film diffuser in communication with display glass 310. Accordingly, a highly reflective but yet clear crisp image will be provided by mirrors 610 having structures 620.

Figure 7:
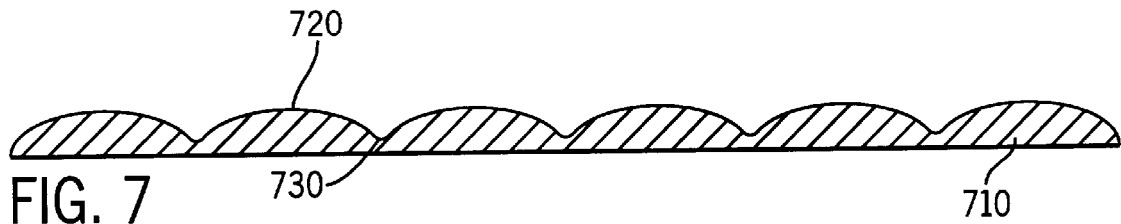
FIG. 7 is cross-sectional view of a charge controlled mirror having a concave surface.

An exemplary embodiment of a cross-sectional view of a mirror, such as a mirror 610, having structures similar to structures 620 configured in the material of mirror 610 is depicted in FIG. 7. Mirror 710 of FIG. 7 includes a plurality of bumps 720 or any of a variety of concave structures which may provide a nubbled surface on mirror 610. Mirror 710 may be representative of a nubbled surface, or depressions 730 may be representative of elongated grooves similar to the grooves depicted in FIG. 6.

Figure 8:
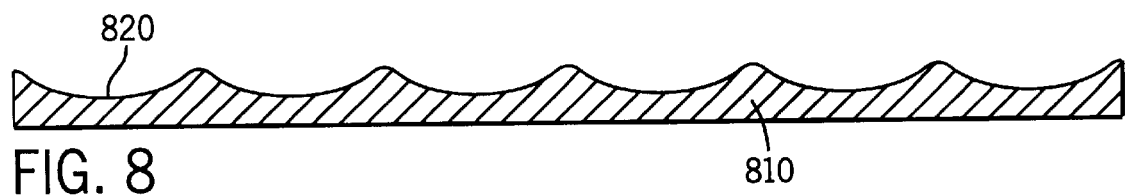
FIG. 8 is a cross-sectional view of a charge controlled mirror having a convex surface.

Referring now to FIG. 8, another exemplary embodiment of a mirror 810 is depicted. Mirror 810 includes a plurality of depressions 820. Depressions 820 may be either an array or a random pattern of circular depressions on the surface of mirror 810 or further may be elongated grooves similar to grooves 620 depicted in FIG. 6.

Figure 9:
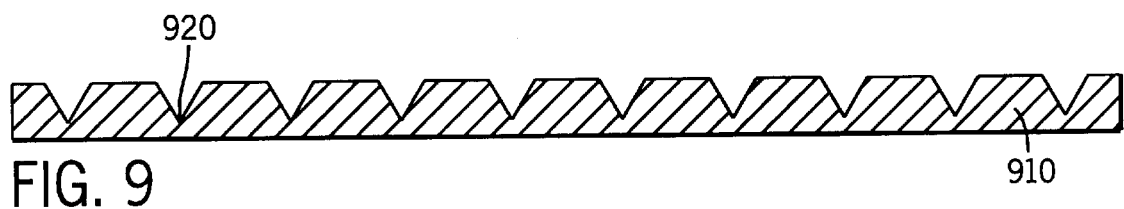
FIG. 9 is a depiction of a charge controlled mirror having a truncated prismatic surface.

Referring now to FIG. 9, a cross-section of another exemplary embodiment of a mirror 910 is depicted. Mirror 910 includes a surface structure having a plurality of depressions 920. Depressions 920 may be representative of an array of depressions such that the surface of mirror 910 forms a plurality of truncated pyramids or depressions 920 may be representative of a plurality of elongated grooves, similar to grooves 620 depicted in FIG. 6.

Figure 10:
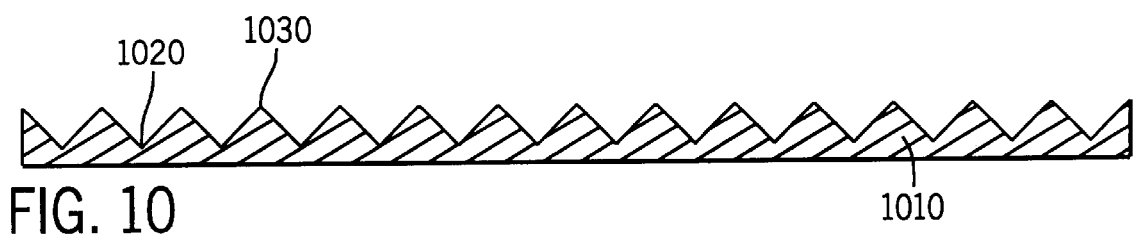
FIG. 10 is a cross-sectional view of a charge controlled mirror having a triangular prismatic surface.

Referring to FIG. 10, yet another exemplary embodiment of a mirror 1010 is depicted. Mirror 1010 includes a plurality of triangular depressions 1020 and triangular peaks 1030. Depressions 1020 and peaks 1030 may be representative of a surface of mirror 1010 having a plurality of pyramidal structures or depressions 1020 and peaks 1030 may be representative of a structure having elongated grooves on the surface of mirror 1010 forming a plurality of triangular grooves and/or a plurality of prismatic structures.

It should be noted that the surface structures depicted in FIGS. 6–10 should not be construed as limiting. Any of a variety of structures which cause reflective diffusion when utilized with a charge controlled mirror or a micro-machine mirror device may be found to be suitable without departing from the scope of the invention. Further, it should be noted that any of a variety of manufacturing techniques may be used to produce the textured surface of the charge controlled mirrors or micro-machine mirrors including, but limited to, the practice of photomasking and etching which is commonly used in the semiconductor industry. Further, any of a variety of other methods and processes may be used to produce such diffusive structures on the surface of a charge controlled mirror.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, communications bus, or processor used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A video display, comprising:
   a light source providing light for the video display; and;
   an array of charge controlled mirrors, each charge controlled mirror of the array being controlled by applying a charge, to selectively reflect light from the light source, dependent upon the applied charge, at least some of the charge controlled mirrors having a textured surface configured to cause reflective diffusion.

2. The video display of claim 1, wherein the textured surface includes an array of grooves.

3. The video display of claim 1, wherein the textured surface includes an array of substantially pyramidal structures.

4. The video display of claim 1, wherein the textured surface includes a randomly arranged surface texture.

5. The video display of claim 1, wherein the video display is configured for use in a portable electronic device.

6. The video display of claim 1, wherein the array of charge controlled mirrors is configured in substantially a matrix structure.

7. The video display of claim 1, wherein the array of charge controlled mirrors is configured to display color.

8. The video display of claim 1, wherein the array of charge controlled mirrors is configured to be a monochromatic display.

9. A mobile electronic device, comprising:
   a processor;
   a light source;
   a charge controlled mirror display, the charge controlled mirror display including an array of charge controlled mirrors at least some of the charge controlled mirrors having a textured surface configured to cause reflective diffusion.

10. The mobile electronic device of claim 9, wherein the textured surface includes an array of grooves.

11. The mobile electronic device of claim 9, wherein the textured surface includes an array of substantially pyramidal structures.

12. The mobile electronic device of claim 9, wherein the textured surface includes a randomly arranged surface texture.

13. The mobile electronic device of claim 9, wherein video display is configured for use in a portable electronic device.

14. The mobile electronic device of claim 9, wherein the array of charge controlled mirrors is configured in substantially a matrix structure.

15. The mobile electronic device of claim 9, wherein the array of charge controlled mirrors is configured to display color.

16. The mobile electronic device of claim 9, wherein the array of charge controlled mirrors is configured to be a monochromatic display.

17. A charge controlled mirror for use in an electronic display device, comprising:
- a selectively reflective surface;
- an electronic coupling to a selective power source,
  - wherein the selectively reflective surface is a substantially textured surface configured to cause diffusion of reflected light and is configured to change reflective properties based on charge provided by the electronic coupling.

18. The charge controlled mirror of claim 17, wherein the textured surface comprises:
- a plurality of grooves.

19. The charge controlled mirror of claim 18, wherein the plurality of grooves define elongated structures having a substantially triangular cross section.

20. The charge controlled mirror of claim 18, wherein the plurality of grooves define elongated structures having a substantially trapezoidal cross section.

21. The charge controlled mirror of claim 17, wherein the textured surface comprises:
- a plurality of pyramids.

22. The charge controlled mirror of claim 17, wherein the textured surface comprises:
- a plurality of truncated pyramids.

23. The charge controlled mirror of claim 17, wherein the textured surface comprises:
- randomly arranged surface structures.

* * * * *